(12) United States Patent
Sridhara et al.

(10) Patent No.: US 9,002,374 B2
(45) Date of Patent: Apr. 7, 2015

(54) MEASUREMENTS FOR INDOOR NAVIGATION

(71) Applicant: QUALCOMM Incorporated, San Diego, CA (US)

(72) Inventors: Vinay Sridhara, Santa Clara, CA (US); Rajarshi Gupta, Sunnyvale, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 13/767,752

(22) Filed: Feb. 14, 2013

(65) Prior Publication Data

US 2014/0228046 A1 Aug. 14, 2014

(51) Int. Cl.
*H04W 4/02* (2009.01)
*G01S 11/06* (2006.01)
*G01S 5/14* (2006.01)
*H04W 64/00* (2009.01)
*G01S 5/02* (2010.01)
*G01C 21/20* (2006.01)

(52) U.S. Cl.
CPC .............. *H04W 4/02* (2013.01); *G01S 11/06* (2013.01); *G01S 5/14* (2013.01); *H04W 64/00* (2013.01); *G01S 5/0257* (2013.01); *G01C 21/206* (2013.01); *G01S 5/0268* (2013.01)

(58) Field of Classification Search
CPC ..... H04W 64/00; H04W 4/02; H03G 3/3042; H03G 3/3036
USPC ................ 455/115.1, 115.5, 456.1, 546.5–6, 455/226.1, 226.2, 132–135, 67.11
See application file for complete search history.

(56) References Cited

U.S. PATENT DOCUMENTS

| | | | |
|---|---|---|---|
| 7,116,988 B2 | 10/2006 | Dietrich et al. | |
| 8,185,129 B2 | 5/2012 | Alizadeh-Shabdiz | |
| 2002/0068571 A1* | 6/2002 | Ohlsson et al. | 455/442 |
| 2008/0008121 A1 | 1/2008 | Alizadeh-Shabdiz | |
| 2008/0227455 A1* | 9/2008 | Kim | 455/436 |

(Continued)

FOREIGN PATENT DOCUMENTS

EP 2044801 4/2009

OTHER PUBLICATIONS

International Search Report and Written Opinion—PCT/US2014/011793—ISA/EPO—Apr. 9, 2014.

(Continued)

*Primary Examiner* — Cong Tran
(74) *Attorney, Agent, or Firm* — Hunter Clark PLLC (57) ABSTRACT

A method of obtaining and using access point signal information includes: receiving signals at a mobile device from a first set of access points during a passive measurement; and performing a first active measurement at the mobile device for the first set of the access points, including: sending at least one first communication each sent toward a respective one of the access points of the first set; and receiving at least one second communication each corresponding to, and responsive to, one of the at least one first communication and received from a corresponding one of the access points of the first set; where the passive measurement and the first active measurement is each performed repeatedly with the first set of the access points being reestablished at each repeat performance of the passive measurement, and with the passive measurement being performed less often than the first active measurement.

32 Claims, 8 Drawing Sheets

(56) References Cited

U.S. PATENT DOCUMENTS

| | | |
|---|---|---|
| 2009/0196254 A1* | 8/2009 | Cha et al. .................. 370/331 |
| 2009/0310585 A1 | 12/2009 | Alizadeh-Shabdiz |
| 2010/0232401 A1 | 9/2010 | Hirsch |
| 2011/0237272 A1* | 9/2011 | Gorokhov et al. ......... 455/452.1 |
| 2012/0058778 A1 | 3/2012 | Waters et al. |
| 2012/0252432 A1* | 10/2012 | Henttonen ................. 455/422.1 |
| 2013/0012229 A1 | 1/2013 | Itagaki et al. |

OTHER PUBLICATIONS

Written Opinion of the International Preliminary Examining Authority—PCT/US2014/011793—IPEA/EPO—Jun. 26, 2014, 8 pages.

* cited by examiner

FIG. 8

MEASUREMENTS FOR INDOOR NAVIGATION

BACKGROUND

Indoor navigation presents challenges not present in outdoor navigation. For example, analysis of received signals from access points in an indoor environment may lead to different possible locations, e.g., different floors of a building. Consequently, location disambiguation is typically performed in order to resolve which of different possible locations is presently correct. Often, received signal strength indication (RSSI) analysis is performed in order to disambiguate locations. RSSI measurements are typically taken in a passive measurement by a mobile device, where the mobile device measures each possible channel for signals from access points (APs) but does not send transmissions to the APs.

SUMMARY

An example method of obtaining and using access point signal information includes: performing a passive measurement at a mobile device for signals from access points, the mobile device receiving signals from a first set of the access points during the passive measurement; and performing a first active measurement at the mobile device for the first set of the access points, the first active measurement including: sending at least one first communication, with each first communication being sent toward a respective one of the access points of the first set of the access points; and receiving at least one second communication each of which corresponds to, and is responsive to, one of the at least one first communication and is received from a corresponding one of the access points of the first set of the access points; where the passive measurement and the first active measurement is each performed repeatedly with the first set of the access points being reestablished at each repeat performance of the passive measurement, and with the passive measurement being performed less often than the first active measurement.

Implementations of such a method may include one or more of the following features. The method further includes performing a second active measurement repeatedly, with the second active measurement being performed more frequently than the first active measurement, the second active measurement including: sending at least one third communication, with each third communication being sent toward a respective access point of a second set of the access points; and receiving at least one fourth communication each of which corresponds to one of the at least one third communication and corresponds to one of the access points of the second set of the access points. The second set of the access points includes only the access point or the access points of the first set of the access points that shares, or share, a disambiguation region with the mobile device according to a most-recent region disambiguation. Only one of the first or second active measurements will be performed at a time. The method further includes performing positioning at the mobile device using information from the first active measurement or the second active measurement each time that the first active measurement or the second active measurement, respectively, is performed. A first operation comprises the passive measurement and the first active measurement, a second operation comprises the first active measurement, and a third operation comprises the second active measurement, and the third operation is performed more often than the second operation, and the second operation is performed more often than the first operation, with multiple performances of the third operation occurring between consecutive performances of the second operation and multiple performances of the second operation occurring between consecutive performances of the first operation.

Also or alternatively, implementations of the method may include one or more of the following features. The method further includes performing region disambiguation at the mobile device each time that the first active measurement is performed. The first set of the access points comprises all of the access points from which the mobile device receives signals during the passive measurement. The first set of the access points contains less than all of the access points from which the mobile device receives signals during the passive measurement.

An example mobile device includes: a measurement module configured to: perform a passive measurement for signals from access points; and perform a first active measurement for a first set of the access points in response to the measurement module receiving signals from the first set of the access points during the passive measurement, wherein to perform the first active measurement the measurement module is configured to: send at least one first communication, with each first communication being sent toward a respective one of the access points of the first set of the access points; and receive at least one second communication each of which corresponds to, and is responsive to, one of the at least one first communication and is received from a corresponding one of the access points of the first set of the access points; where the measurement module is configured to perform each of the passive measurement and the first active measurement repeatedly with the first set of the access points being reestablished at each repeat performance of the passive measurement, and with the passive measurement being performed less often than the first active measurement.

Implementations of such a mobile device may include one or more of the following features. The measurement module is further configured to perform a second active measurement repeatedly and more frequently than the first active measurement, wherein to perform the second active measurement the measurement module is configured to: send at least one third communication, with each third communication being sent toward a respective access point of a second set of the access points; and receive at least one fourth communication each of which corresponds to one of the at least one third communication and corresponds to one of the access points of the second set of the access points. The measurement module is configured to use as the second set of the access points, only the access point or the access points of the first set of the access points that shares, or share, a disambiguation region with the mobile device according to a most-recent region disambiguation. The measurement module is configured to perform only one of the first or second active measurements at a time. The mobile device further includes a position module, communicatively coupled to the measurement module, configured to determine a position of the mobile device using information from the first active measurement or the second active measurement each time that the first active measurement or the second active measurement, respectively, is performed. A first operation comprises the passive measurement and the first active measurement, a second operation comprises the first active measurement, and a third operation comprises the second active measurement, and the measurement module is configured to perform the third operation more often than the second operation, and to perform the second operation more often than the first operation, with multiple performances of the third operation occurring between consecutive performances of the second operation and multiple performances of the second operation occurring between consecutive performances of the first operation.

Also or alternatively, implementations of the mobile device may include one or more of the following features. The mobile device further includes a disambiguation module, communicatively coupled to the measurement module, configured to perform region disambiguation each time that the first active measurement is performed. The measurement module is configured to use as the first set of the access points, all of the access points from which the mobile device receives signals during the passive measurement. The measurement module is configured to use as the first set of the access points, less than all of the access points from which the mobile device receives signals during the passive measurement.

Another example mobile device includes: passive measuring means for performing a passive measurement for signals from access points; and first active measuring means for performing a first active measurement for a first set of the access points in response to the passive measuring means receiving signals from the first set of the access points during the passive measurement, wherein to perform the first active measurement the first active measuring means is configured to: send at least one first communication, with each first communication being sent toward a respective one of the access points of the first set of the access points; and receive at least one second communication each of which corresponds to, and is responsive to, one of the at least one first communication and is received from a corresponding one of the access points of the first set of the access points; where the passive measuring means and the first active measuring means are configured to perform each of the passive measurement and the first active measurement repeatedly with the first set of the access points being reestablished at each repeat performance of the passive measurement, and with the passive measurement being performed less often than the first active measurement.

Implementations of such a mobile device may include one or more of the following features. The mobile device further includes second active measuring means for performing a second active measurement repeatedly and more frequently than the first active measurement, wherein to perform the second active measurement the second active measuring means is configured to: send at least one third communication, with each third communication being sent toward a respective access point of a second set of the access points; and receive at least one fourth communication each of which corresponds to one of the at least one third communication and corresponds to one of the access points of the second set of the access points. The second active measuring means is configured to use as the second set of the access points, only the access point or the access points of the first set of the access points that shares, or share, a disambiguation region with the mobile device according to a most-recent region disambiguation. The first active measuring means and the second active measuring means are configured to perform only one of the first or second active measurements at a time. The mobile device further includes position determining means for determining a position of the mobile device using information from the first active measurement or the second active measurement each time that the first active measurement or the second active measurement, respectively, is performed. A first operation comprises the passive measurement and the first active measurement, a second operation comprises the first active measurement, and a third operation comprises the second active measurement, and the passive measuring means, the first active measuring means, and the second active measuring means are configured to perform the third operation more often than the second operation, and to perform the second operation more often than the first operation, with multiple performances of the third operation occurring between consecutive performances of the second operation and multiple performances of the second operation occurring between consecutive performances of the first operation.

Also or alternatively, implementations of the mobile device may include one or more of the following features. The mobile device further includes position disambiguating means for performing region disambiguation each time that the first active measurement is performed. The first active measuring means is configured to use as the first set of the access points, all of the access points from which the mobile device receives signals during the passive measurement. The first active measuring means is configured to use as the first set of the access points, less than all of the access points from which the mobile device receives signals during the passive measurement.

An example processor-readable storage medium includes processor-readable instructions configured to cause a processor to: perform a passive measurement for signals from access points; and perform a first active measurement for a first set of the access points in response to receiving signals from the first set of the access points during the passive measurement, wherein to perform the first active measurement, the instructions are configured to cause the processor to: send at least one first communication, with each first communication being sent toward a respective one of the access points of the first set of the access points; and receive at least one second communication each of which corresponds to, and is responsive to, one of the at least one first communication and is received from a corresponding one of the access points of the first set of the access points; where the instructions are configured to cause the processor to perform each of the passive measurement and the first active measurement repeatedly with the first set of the access points being reestablished at each repeat performance of the passive measurement, and with the passive measurement being performed less often than the first active measurement.

Implementations of such a processor-readable storage medium may include one or more of the following features. The processor-readable storage medium further includes instructions configured to cause the processor to perform a second active measurement repeatedly and more frequently than the first active measurement, wherein to perform the second active measurement the instructions are configured to cause the processor to: send at least one third communication, with each third communication being sent toward a respective access point of a second set of the access points; and receive at least one fourth communication each of which corresponds to one of the at least one third communication and corresponds to one of the access points of the second set of the access points. The instructions are configured to cause the processor to use as the second set of the access points, only the access point or the access points of the first set of the access points that shares, or share, a disambiguation region with a mobile device according to a most-recent region disambiguation. The instructions are configured to cause the processor to perform only one of the first or second active measurements at a time. The processor-readable storage medium further includes instructions configured to cause the processor to determine a position of a mobile device using information from the first active measurement or the second active measurement each time that the first active measurement or the second active measurement, respectively, is performed. A first operation comprises the passive measurement and the first active measurement, a second operation comprises the first active measurement, and a third operation comprises the second active measurement, and the instructions are configured to cause the processor to perform the third operation more often than the second operation, and to perform the second operation more often than the first operation, with multiple performances of the third operation occurring between consecutive performances of the second operation and multiple performances of the second operation occurring between consecutive performances of the first operation.

Also or alternatively, implementations of the processor-readable storage medium may include one or more of the following features. The processor-readable storage medium further includes instructions configured to cause the processor to perform region disambiguation each time that the first active measurement is performed. The instructions are configured to cause the processor to use as the first set of the access points, all of the access points from which a mobile device receives signals during the passive measurement. The instructions are configured to cause the processor to use as the first set of the access points, less than all of the access points from which a mobile device receives signals during the passive measurement.

Items and/or techniques described herein may provide one or more of the following capabilities, as well as other capabilities not mentioned. Indoor position disambiguation may be performed quickly and in a power efficient manner. Other capabilities may be provided and not every implementation according to the disclosure must provide any, let alone all, of the capabilities discussed.

DETAILED DESCRIPTION

Techniques are provided for obtaining information from which positioning and location disambiguation may be performed. For example, a mobile device may passively measure for RSSI information periodically, and more frequently obtain active measurements for use in positioning and/or location disambiguation.

Examples of determining position and performing location disambiguation apply multiple signal measuring techniques in a time division multiplexed manner. For example, each technique is performed periodically, with the different techniques interspersed or intertwined, and possibly performed together.

Figure 1:
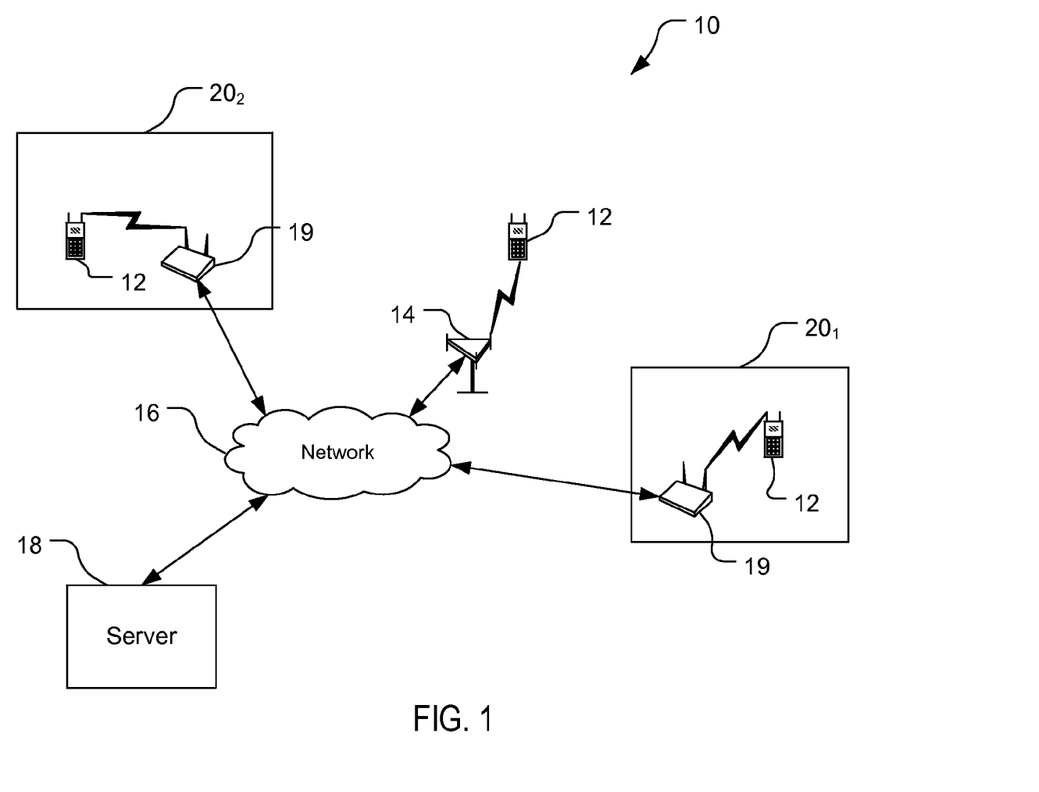
FIG. 1 is a simplified diagram of a wireless communication system.
Figure 2:
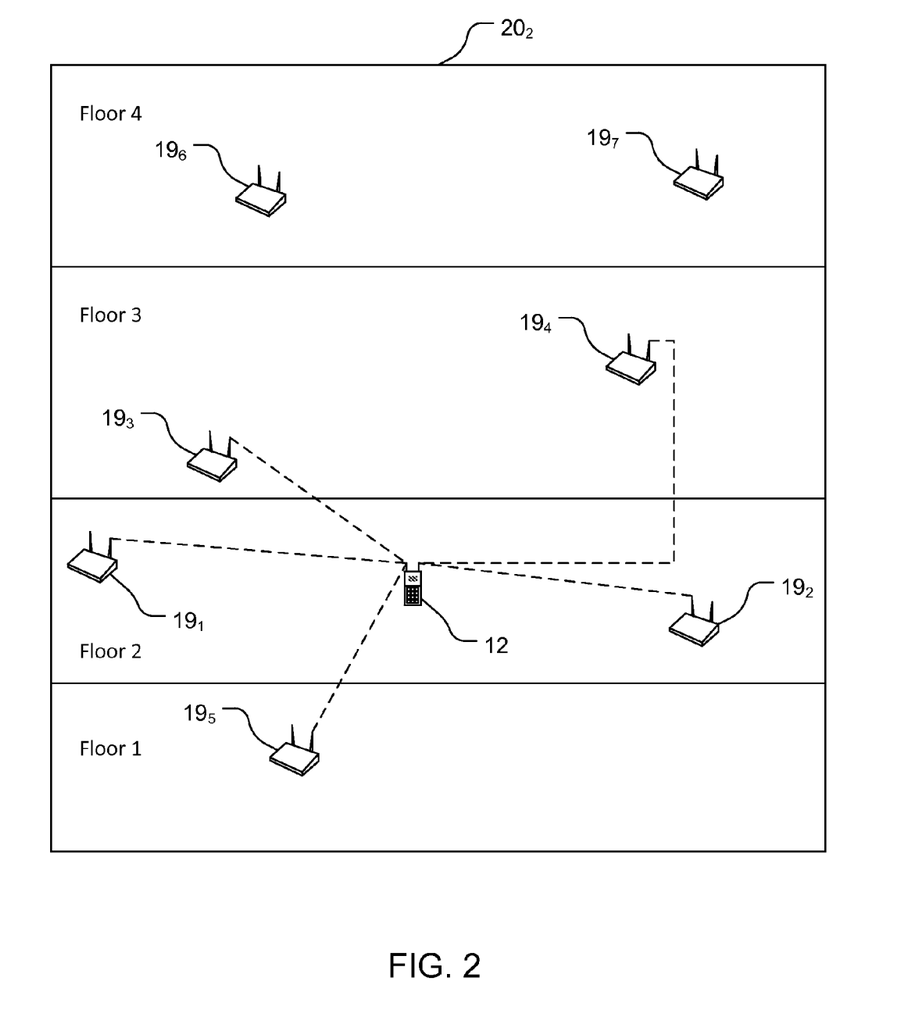
FIG. 2 is a simplified diagram of wireless transceivers and a mobile station in a building shown in FIG. 1.

Referring to FIGS. 1-2, a communication system 10 includes a mobile devices 12, a base transceiver station (BTS) 14, a network 16, a server 18, and access points (APs) 19, that are wireless transceivers, disposed in structures, here buildings 20. The system 10 is a communication system in that the system 10 can at least send and receive communications. Although only one server 18 is shown for simplicity, more than one server 18 may be used in the system 10, e.g., in various locations to provide quicker access as the system 10 may span large regions, e.g., entire countries or continents, or even the planet.

The BTS 14 can wirelessly communicate with the mobile devices 12 via antennas. Each of the BTSs 14 may also be referred to as an access point, an access node (AN), a Node B, an evolved Node B (Enb), etc. The BTSs 14 are configured to communicate wirelessly with the mobile devices 12 under the control of the server 18 (via the network 16).

The mobile devices 12 can be moved to various locations, including into the buildings 20 and onto different floors of the buildings 20. The mobile devices 12 may be referred to as access terminals (ATs), mobile devices, user equipment (UE), or subscriber units. The mobile devices 12 are shown here as cellular phones. Other examples of mobile devices include wireless routers, personal digital assistants (PDAs), netbooks, notebook computers, tablet computers, etc. Only one mobile device 12 is shown in FIG. 2, and to simplify the discussion below only this mobile device 12 is discussed.

The server 18 preferably can communicate with the APs 19 within the buildings 20 through the network 16. The APs 19 are preferably hard-wire connected to the network 16.

Figure 3:
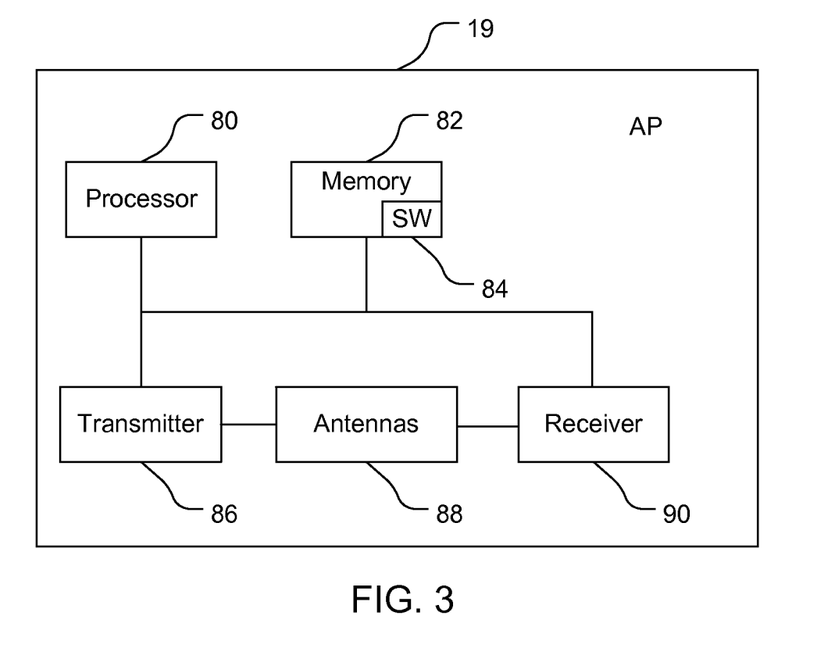
FIGS. 3-4 are block diagrams of one of the wireless transceivers and the mobile device shown in FIG. 2.

Referring to FIG. 3, an example of one of the APs 19 comprises a computer system including a processor 80, memory 82 including software 84, a transmitter 86, antennas 88, and a receiver 90. The transmitter 86, antennas 88, and the receiver 90 form a wireless communication module (with the transmitter 86 and the receiver 90 being a transceiver). The transmitter 86 is connected to one of the antennas 88 and the receiver 90 is connected to another of the antennas 88. Other example APs may have different configurations, e.g., with only one antenna 88, and/or with multiple transmitters 86 and/or multiple receivers 90. The transmitter 86 and the receiver 90 are configured such that the AP 19 can communicate bi-directionally with the mobile device 12 via the antennas 88, sending AP signal information and receiving mobile device signal information. The processor 80 is preferably an intelligent hardware device, e.g., a central processing unit (CPU) such as those made by ARM®, Intel® Corporation, or AMD®, a microcontroller, an application specific integrated circuit (ASIC), etc. The processor 80 could comprise multiple separate physical entities that can be distributed in the AP 19. The memory 82 is a processor-readable storage medium and includes random access memory (RAM) and read-only memory (ROM). The memory 82 stores the software 84 which is processor-readable, processor-executable software code containing instructions that are configured to, when executed, cause the processor 80 to perform various functions described herein (although the description may refer only to the processor 80 performing the functions). Alternatively, the software 84 may not be directly executable by the processor 80 but configured to cause the processor 80, e.g., when compiled and executed, to perform the functions.

Figure 4:
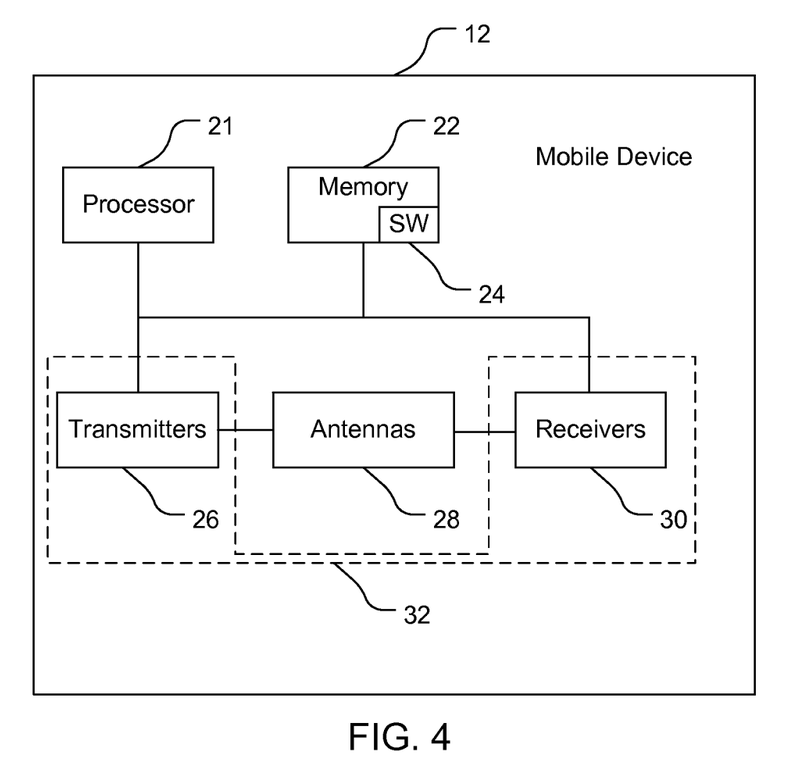

Referring to FIG. 4, the mobile device 12 comprises a computer system including a processor 21, memory 22 including software 24, transmitters 26, antennas 28, and receivers 30. The transmitters 26, antennas 28, and receivers 30 form a wireless communication module (with the transmitters 26 and receivers 30 being a transceiver 32) that can communicate with the BTS 14 and a wide area network (WAN) and/or a personal area network (PAN) and/or a WiFi node and/or another entity. Other example mobile devices may have different configurations, e.g., with only one transmitter 26 and/or only one receiver 30, e.g., with only one physical entity capable of implementing its role (receiver, transmitter). The transmitters 26 and receivers 30 are configured to communicate bi-directionally with the BTS 14 and the APs 19 via the antennas 28. The antennas 28 include a satellite positioning system (SPS) antenna for receiving SPS signals and the receivers 30 include an SPS receiver for processing and transferring the SPS signals to the processor 21. The processor 21 is preferably an intelligent hardware device, e.g., a central processing unit (CPU) such as those made by ARM®, Intel® Corporation, or AMD®, a microcontroller, an application specific integrated circuit (ASIC), etc. The processor 21 could comprise multiple separate physical entities that can be distributed in the mobile device 12. The memory 22 is a processor-readable storage medium and includes random access memory (RAM) and read-only memory (ROM). The memory 22 stores the software 24 which is processor-readable, processor-executable software code containing instructions that are configured to, when executed, cause the processor 21 to perform various functions described herein (although the description may refer only to the processor 21 performing the functions). Alternatively, the software 24 may not be directly executable by the processor 21 but configured to cause the processor 21, e.g., when compiled and executed, to perform the functions.

Figure 5:
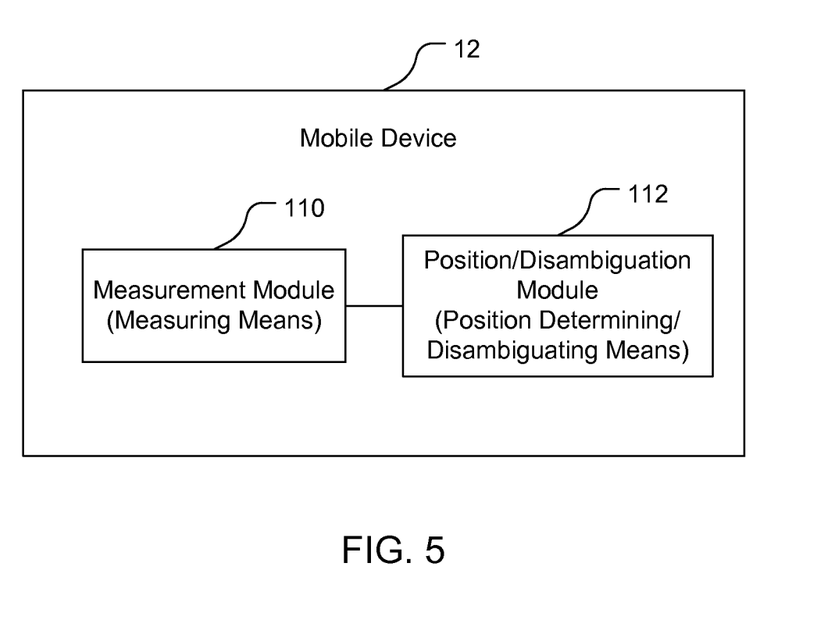
FIG. 5 is a block diagram of functional modules of the mobile device shown in FIG. 4.

Referring to FIG. 5, the mobile device 12 includes a measurement module (measuring means) 110 and a position/disambiguation module (including position determining means and position disambiguating means) 112. The measurement module 110 and the position/disambiguation module 112 are functional modules implemented by the processor 21 and the software 24 stored in the memory 22 in conjunction with the transceiver 32 and one or more of the antennas 28 as appropriate. Thus, reference to either of the measurement module 110 or the position/disambiguation module 112 performing or being configured to perform a function is shorthand for the processor 21 performing or being configured to perform the function in accordance with the software 24 (and/or firmware, and/or hardware of the processor 21) in conjunction with the transceiver 32 and one or more of the antennas 28 as appropriate.

The measurement module 110 is configured to obtain measurements, discussed more fully below, and the position/disambiguation module 112 is configured to determine a location of the mobile device 12 and/or to disambiguate a position of the mobile device 12 using these measurements. For example, the position/disambiguation module 112 can perform trilateration using signal measurements (e.g., RSSI (received signal strength indication), RTT (round-trip time)) and/or disambiguate between multiple possible disambiguation regions (e.g., floors) within the building 20, e.g., using RSSI and/or RTT measurements and known locations of the APs 19. The disambiguation regions are different regions defined within the building 20 between which the presence of the mobile device 12 can be determined.

The measurement module 110 is configured to perform a variety of measurements for the APs 19 by sending and/or receiving communications to/from the APs 19. The measurement module 110 can perform, in this example, three types of measurements, a passive measurement and two forms of active measurements, each of which is discussed in more detail as follows. The measuring means thus includes passive measuring means for performing a passive measurement, first active measuring means for performing a first active measurement, and second active measuring means for performing a second active measurement.

The passive measurement, here referred to as Measurement1, is a passive measurement in which the mobile device 12 measures or listens on each channel on which the APs 19 and the mobile device 12 are configured to communicate. The mobile device 12 will measure an RSSI for each AP signal that it hears and store information (e.g., identity, locations) for each such AP 19 for use in other measurements. The mobile device 12 can, for example, read beacon frames transmitted by the APs 19 and the mobile device 12 dwells about 100 ms (plus some delta time) for each channel to hear the beacon frames for all APs 19 sending beacon frames on the respective channel. The beacon frames are typically transmitted at a relatively low rate (compared to possible rates of the APs 19) with a relatively high transmit power to provide corresponding relatively high reception range (i.e., distance that the transmitted beacon signal can be received and understood). The mobile device 12 is configured to determine or elicit, from the passive measurement (e.g., of the beacon signals), information that indicates APs 19 that are good candidates for active measurements to obtain information for use in determining a position of the mobile device 12. For example, the mobile device 12 can determine from which APs 19 signals are received and the signal strengths of those signals. The mobile device 12 is also, or alternatively, configured to determine communication protocol capability(ies) of each of the APs 19, e.g., whether an AP 19 is 802.11g or 802.11n capable. The mobile device 12 is also, or alternatively, configured to obtain SIFS (short inter-frame space) information if such information is included in a signal received from an AP 19.

The first active measurement, here referred to as Measurement2, is an RTS-CTS (Request-to-Send-Clear-to-Send) measurement of preferably (although not necessarily) all APs 19 discovered during the most recent passive measurement. In Measurement2, the mobile device 12 sends a request-to-send (RTS) message toward a first set of the APs 19 from which signals were received during the most recent passive measurement, e.g., all of the APs 19 that the most recent passive measurement heard. Further in Measurement2, the mobile device 12 receives clear-to-send (CTS) messages in response to the RTS messages, although the mobile device 12 may not receive responses from all of the APs 19 toward which RTS messages were sent. The APs 19 in the first set of the APs 19 may be different for repeated performances of Measurement2 and may not include all of the APs from which signals were received during the passive measurement. The mobile device 12 measures the RTT to send the RTS messages and receive the CTS messages. Measurement2 takes about 20 ms per AP 19. A relatively higher transmission rate may be used for Measurement2 than Measurement1, with a correspondingly lower range than the signals in Measurement1.

The second active measurement, here referred to as Measurement3 is an RTS-CTS measurement of preferably (although not necessarily) only and all the APs 19 discovered during the most recent passive measurement and determined to be in the same disambiguation region of the building 20 as the mobile device 12. The known locations of the APs 19 and the most-recently determined position of the mobile device 12 are used by the processor 21 to determine which APs 19 are in the same disambiguation region of the building 20 as the mobile device 12. In Measurement3, the mobile device 12 sends an RTS message toward a second set of the APs 19 that preferably includes all (but could only include a subset) of the APs 19 that the most recent passive measurement heard that are in (i.e., share) the same disambiguation region as the mobile device 12 (e.g., on the same floor as the mobile device 12) according to the most-recent region disambiguation. The APs 19 in the second set of the APs 19 may be different for repeated performances of Measurement3 and may not include all the APs 19 in the first set of the APs 19. The processor 21 determines the RTTs for the APs 19 based on the timing of the sent RTS messages and the corresponding received CTS messages. Each of the active measurements, Measurement2 and Measurement3, will typically consume less power and take less time to perform than the passive measurement, Measurement1.

The measurement module 110 is configured to implement a measurement strategy. The measurement strategy is preferably implemented to identify APs 19 and measure signals for use in position determination in a power-efficient manner. The measurement strategy is a plan for performing different measurements over time, e.g., in a pattern to provide reliable positioning with low power usage. The measurement module 110 implements a pattern with sub-patterns of different measurement types, here using a combination of the three measurement types discussed above. Measurements using relatively more power and/or relatively more time to perform are performed less often than measurements using relatively less power and/or relatively less time to perform. Measurements to determine which APs are available for use in determining a mobile device's location may be performed less frequently than measurements to obtain information from which the mobile device's location may be determined. Measurements may be performed in a periodic, repeating pattern, or in semi-periodic patterns (e.g., with multiple periodic sub-patterns within a pattern), or may be performed non-periodically, or using a strategy that combines one or more periodic sequences of the measurements with one or more time periods of one or more non-periodic sequences of the measurements. Different measurement types may be interlaced or interspersed, with one or more measurements of one measurement type being performed in between measurements of another measurement type.

Figure 6:
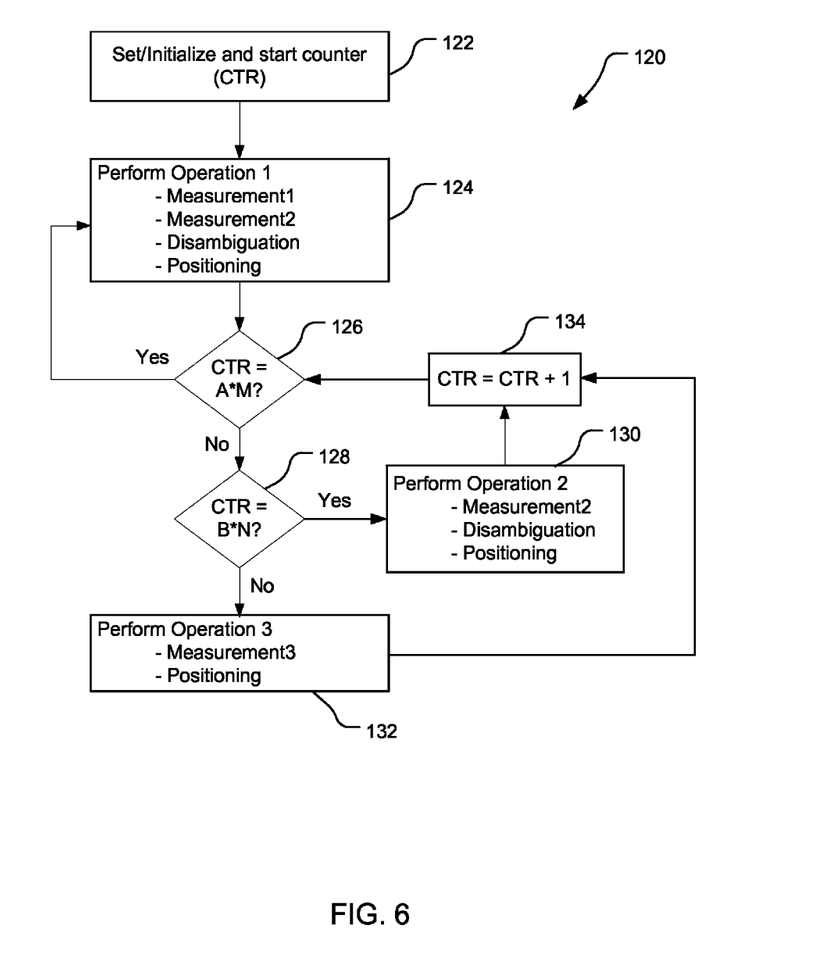
FIG. 6 is a block flow diagram of a process of obtaining information for use in positioning and/or position disambiguation.

Referring to FIG. 6, with further reference to FIGS. 1-5 and 7, a process 120 of obtaining information for use in positioning and/or position disambiguation includes the stages shown. The process 120 is, however, an example only and not limiting. The process 120 can be altered, e.g., by having stages added, removed, rearranged, combined, and/or performed concurrently. For example, the process 120 uses a counter for selecting operations, but other mechanisms could be used, e.g., a timer, a repeating loop of a complete cycle of the operations without a timer or a counter and with or without delay built in between operations, etc. The discussion of FIG. 6 below is for an illustrative example of a layout and signal reception shown in FIG. 2, but this is provided for ease of understanding, and the techniques discussed herein are not limited to this example.

Figure 7:
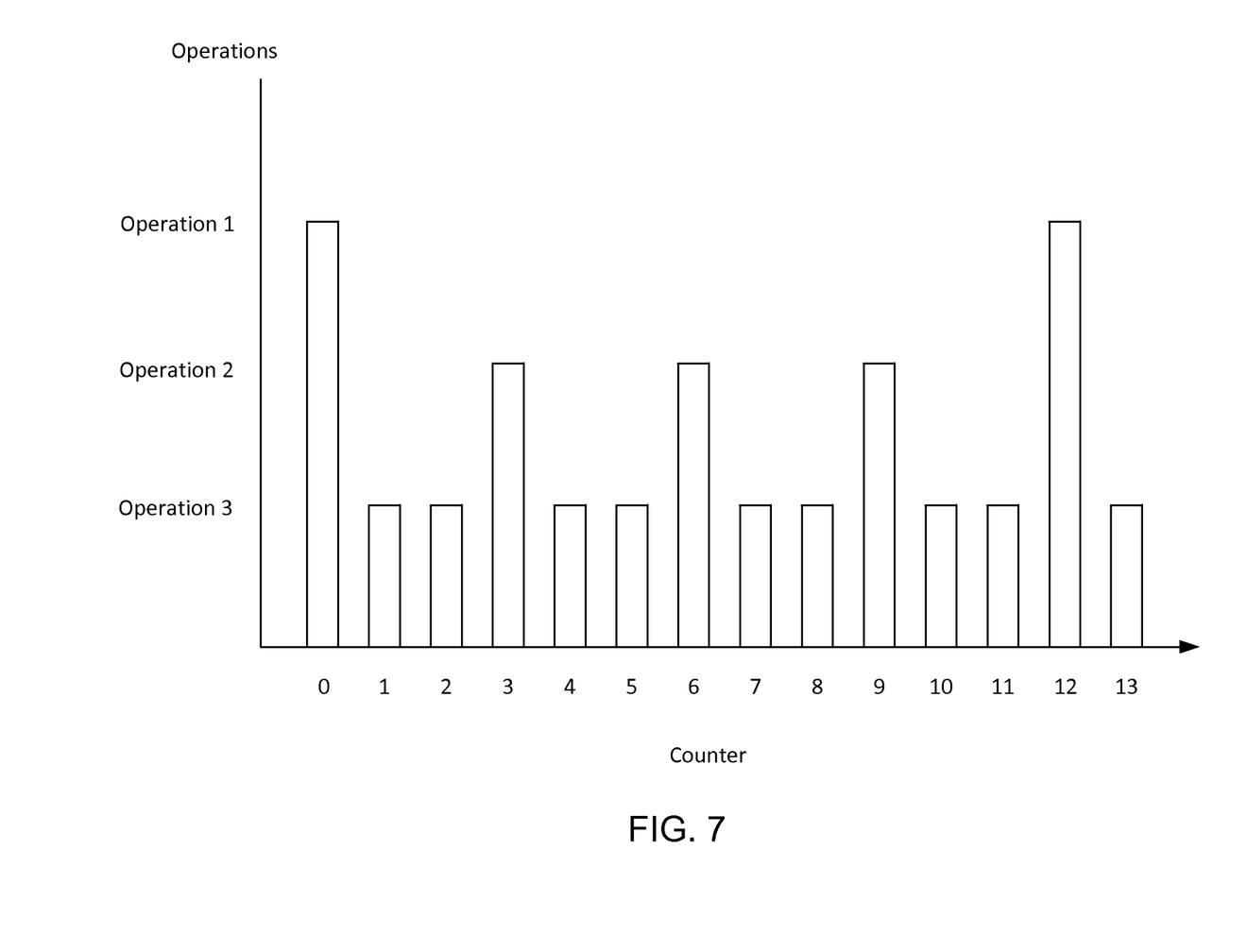
FIG. 7 is a graph of an operation pattern according to the process shown in FIG. 6.

The process 120 implements a specific example of a strategy for using the three types of measurements. Numerous other strategies could be implemented. In this example process, there are three operations, Operation 1, Operation 2, and Operation 3. Operation 1 includes Measurement1, Measurement2, disambiguation by the position/disambiguation module 112, and positioning by the position/disambiguation module 112. Operation 2 includes Measurement2, disambiguation by the position/disambiguation module 112, and positioning by the position/disambiguation module 112. Operation 3 includes Measurement3 and positioning by the position/disambiguation module 112. Operation 1 has priority over Operation 2, which has priority over Operation 3. Thus, Operation 2 is not performed if Operation 1 is performed, and Operation 3 is not performed if either Operation 1 or Operation 2 is performed. Operation 1 is performed less often than Operation 2, and Operation 2 is performed less often than Operation 3 (i.e., Operation 3 is performed more often than Operation 2, and Operation 2 is performed more often than Operation 1). In the example shown in FIG. 7, multiple performances of Operation 3 occur between consecutive performances of Operation 2 and multiple performances of Operation 2 occur between consecutive performances of Operation 1. More specifically, in this example, Operation 1 is performed once every 12 seconds, Operation 2 is performed once every 3 seconds, and Operation 3 is performed once every second, except as Operation 1 or Operation 2 are preempted by the priorities of the operations. The timing of this example strategy is shown in FIG. 7. In FIG. 7, bars indicate which measurements are initiated at which counter values.

At stage 122, a counter is set/initialized and started. Initially, the processor 21 sets a counter (CTR) to zero (0), e.g., after power up of the mobile device 12. Once the counter is set to zero, the processor 21 starts the counter. Here, the processor 21 increments the counter once per second, with Operation 1, Operation 2, and Operation 3 each assumed to take less than the time to perform any of these functions, here less than one second to perform.

At stage 124, Operation 1 is performed. In this example, Operation 1 will be performed when the counter is a multiple (M) of an Operation 1 counter value A (e.g., with the counter equal to zero or 12 as shown in FIG. 7 for A=12). The measurement module 110 performs a passive measurement, listening for APs 19 within range. The measurement module 110 performs Measurement1 to collect information from APs 19 in a passive measurement. In the illustrative example shown in FIG. 2, signals are received by the mobile device 12 from APs $19_1$-$19_5$. The measurement module 110 further performs Measurement2, and collects information from APs 19 for use in disambiguation and/or positioning (determining the position) of the mobile device 12. In the illustrative example of FIG. 2, the measurement module 110 sends RTS signals to, and receives CTS signals from, the APs $19_1$-$19_5$. The position/disambiguation module 112 uses information (e.g., RSSI, RTT) collected by the measurement module 110 to disambiguate the region containing the mobile device 12 and to determine a position of the mobile device 12.

At stage 126, an inquiry is made as to whether the counter equals an integer multiple (M) of the Operation 1 counter value A. The processor 21 analyzes the counter to determine whether it is an integer multiple of A, e.g., if a remainder of dividing the counter by A equals zero. If the counter is an integer multiple of A, then the process 120 returns to stage 124 for performance of Operation 1. If the counter is not an integer multiple of A, then the process 120 proceeds to stage 128.

At stage 128, an inquiry is made as to whether the counter equals an integer multiple (N) of an Operation 2 counter value B (e.g., an integer multiple of 3 as shown in FIG. 7 with B=3). The processor 21 analyzes the counter to determine whether it is an integer multiple of B, e.g., if a remainder of dividing the counter by B equals zero. If the counter is an integer multiple of B, then the process 120 proceeds to stage 130 for performance of Operation 2. If the counter is not an integer multiple of B, then the process 120 proceeds to stage 132 for the performance of Operation 3.

At stage 130, Operation 2 is performed. Operation 2 will be performed when the counter is a multiple of the Operation 2 counter value B, but not a multiple of the Operation 1 counter value A (e.g., with the counter equal to three, six, or nine as shown in FIG. 7). The measurement module 110 performs the active measurement Measurement2 to collect information from APs 19 for use in disambiguation and/or positioning (determining the position) of the mobile device 12. Here again, in the illustrative example of FIG. 2, the measurement module 110 sends RTS signals to, and receives CTS signals from, the APs 19'-19$_5$. The position/disambiguation module 112 uses information (e.g., RSSI, RTT) collected by the measurement module 110 to disambiguate the region containing the mobile device 12 and to determine a position of the mobile device 12.

At stage 132, Operation 3 is performed. Operation 3 will be performed when the counter is not a multiple of the Operation 2 counter value B (e.g., with the counter equal to one, two, four, five, seven, eight, ten (10), eleven (11), and thirteen (13) as shown in FIG. 7). The measurement module 110 performs the active measurement Measurement3 to collect information from APs 19 for use in positioning (determining the position) of the mobile device 12. In the illustrative example of FIG. 2, the measurement module 110 collects information from the APs 19$_1$-19$_2$ that are in the same disambiguation region, here a floor, as the mobile device 12, here Floor 2. The position/disambiguation module 112 uses information (e.g., RSSI, RTT) collected by the measurement module 110 to determine a position of the mobile device 12.

After either stage 130 or stage 132, the process 120 proceeds to stage 134 for incrementing of the counter. The process 120 waits until the processor 21 increments the counter value at the next one-second mark from the starting of the counter. The process 120 then returns to stage 126. The process 120 will preferably continue until the mobile device 12 is powered down or all applications using the measurement module 110 and the position/disambiguation module 112 are shut off.

The process 120 is an example, and many other examples are possible. For example, the counter may be incremented at a different rate than once per second. Further, the frequencies of Operations 1, 2, and 3 may be different than as discussed with respect to the process 120, e.g., with Operation 1 being performed every 20 seconds or 20 counter increments, Operation 2 being performed every five seconds or five counter increments, and Operation 1 being performed every two seconds or two counter cycles. Still other frequencies or patterns are possible. Further still, the interlacing pattern of Operations 1, 2, and 3 may be different than as shown in FIG. 7, with the Operation 1 counter value equal to a number other than 12 and/or with the Operation 2 counter value equal to a number other than 3. Further still, Operations 1, 2, and 3 may be performed using a strategy other than a repeating pattern, e.g., with an irregular or even random sequence of the operations, or irregular intervals, or one or more regular, repeating patterns interrupted by one or more portions of time where the one or more patterns is not followed. Alternatively still, the measurements may not be arranged in the Operations 1, 2, and 3. It is preferred, although not required, that Measurement1, Measurement2, and Measurement3 are performed such that Measurement1 is peformed less often than Measurement2, which is performed less often than Measurement3.

Figure 8:
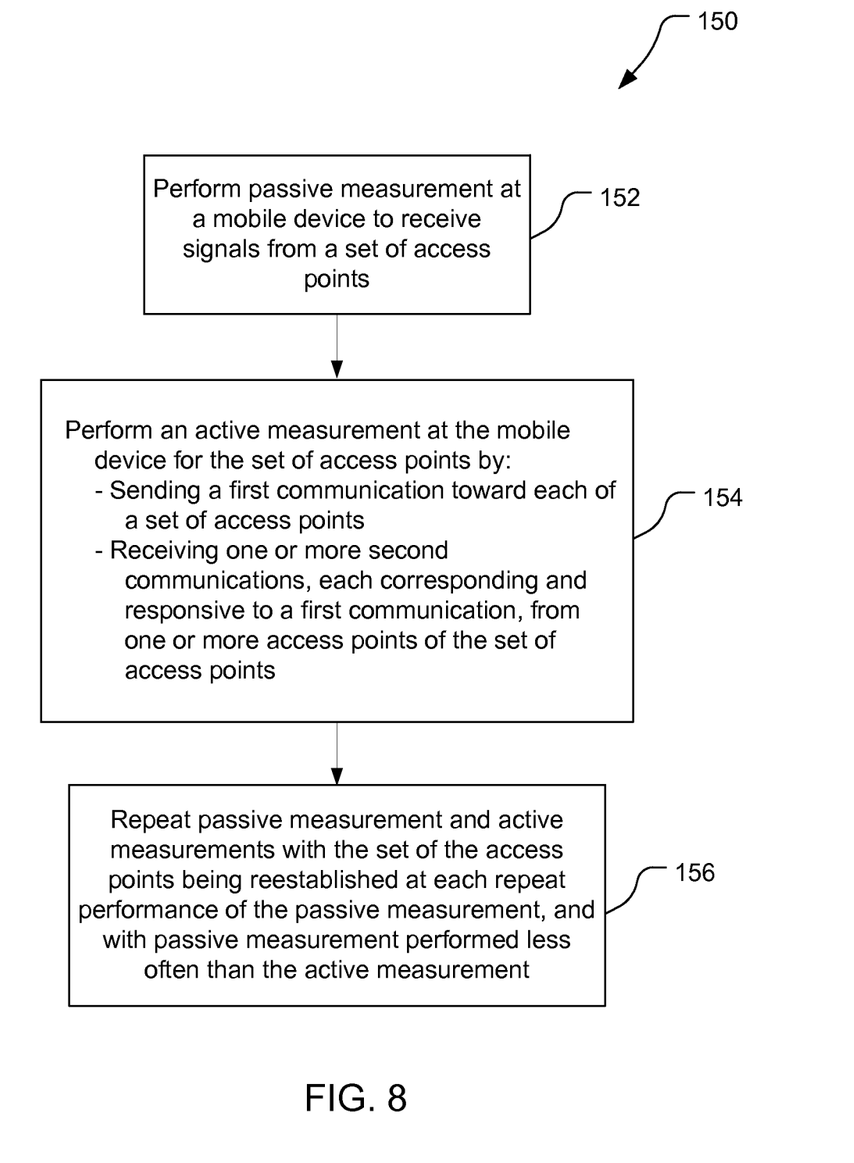
FIG. 8 is a block flow diagram of another process of obtaining information for use in positioning and/or position disambiguation.

Referring to FIG. 8, with further reference to FIGS. 1-5, a process 150 of obtaining information for use in positioning and/or position disambiguation includes the stages shown. The process 150 is, however, an example only and not limiting. The process 150 can be altered, e.g., by having stages added, removed, rearranged, combined, and/or performed concurrently. The process 150 is another example, in addition to the process 120 shown in FIG. 6, of a process of obtaining information for use in positioning and/or disambiguation. Numerous other examples are possible.

At stage 152, a passive measurement is performed. The measurement module 110 performs the passive measurement (e.g., Measurement1) to receive signals from a set of the access points.

At stage 154, an active measurement is performed. The measurement module 110 performs the active measurement (e.g., Measurement2) for the set of the access points 19 from which signals are received in stage 152. The measurement module 110 sends a first communication toward each of the access points 19 in the set of access points. The measurement module 110 further receives one or more second communications, each corresponding and responsive to a first communication, from one or more corresponding access points 19 of the set of the access points. That is, each of the access points 19 that receives a first communication sends a second communication, in response to receiving the first communication and corresponding to the received first communication, toward the mobile device 12. The mobile device 12 may or may not receive all of the second communications.

At stage 156, each of the passive measurement and the active measurement is performed repeatedly with the set of the access points 19 being reestablished at each repeat performance of the passive measurement, and with the passive measurement being performed less often than the active measurement. The repetition of the passive and active measurements may be in accordance with a variety of patterns, e.g., random, fixed quantities of the active measurement performed between consecutive performances of the passive measurement, etc.

Other Considerations

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

What is claimed is:

1. A method for performing signal measurements, the method comprising:
    performing a passive measurement at a mobile device for signals from access points to establish a first set of the access points comprising at least a sublet of all of the access points from which the mobile device receives the signals;
    performing a first active measurement at the mobile device for the first set of the access points, the first active measurement including:
        transmitting at least one first communication toward at least one of the access points of the first set of the access points; and
        receiving, from the at least one of the access points of the first set of the access points, at least one second communication which corresponds to, and is responsive to, the at least one first communication;
        wherein the passive measurement and the first active measurement is each performed repeatedly with the first set of the access points being reestablished at each repeat performance of the passive measurement, and with the passive measurement being performed less often than the first active measurement; and
    performing a second active measurement repeatedly at the mobile device, with the second active measurement being performed more frequently than the first active measurement, the second active measurement including:
        transmitting at least one third communication toward at least one access point of a second set of the access points; and
        receiving at least one fourth communication which corresponds to the at least one third communication.

2. The method of claim 1, wherein the second set of the access points includes only the access point or the access points of the first set of the access points that shares, or share, a disambiguation region with the mobile device according to a most-recent region disambiguation.

3. The method of claim 1, wherein only one of the first or second active measurements will be performed at a time.

4. The method of claim 1, further comprising performing positioning at the mobile device using information from the first active measurement or the second active measurement each time that the first active measurement or the second active measurement, respectively, is performed.

5. The method of claim 1, wherein a first operation comprises the passive measurement and the first active measurement, a second operation comprises the first active measurement, and a third operation comprises the second active measurement, and wherein the third operation is performed more often than the second operation, and the second operation is performed more often than the first operation, with multiple performances of the third operation occurring between consecutive performances of the second operation and multiple performances of the second operation occurring between consecutive performances of the first operation.

6. The method of claim 1 further comprising performing region disambiguation at the mobile device each time that the first active measurement is performed.

7. The method of claim 1 wherein the first set of the access points comprises all of the access points from which the mobile device receives signals during the passive measurement.

8. The method of claim 1 wherein the first set of the access points contains less than all of the access points from which the mobile device receives signals during the passive measurement.

9. A mobile device comprising:
a transceiver; and
a measurement module communicatively coupled to the transceiver and configured to:
  perform a passive measurement for signals from access points to establish a first set of the access points comprising at least a subset of all of the access points from which the mobile device receives the signals;
  perform a first active measurement for the first set of the access points, wherein to perform the first active measurement the measurement module is configured to:
    transmit at least one first communication, via the transceiver, toward at least one of the access points of the first set of the access points; and
    receive at least one second communication, via the transceiver from the at least one of the access points of the first set of the access points, which corresponds to, and is responsive to, one of the at least one first communication;
  wherein the measurement module is configured to perform each of the passive measurement and the first active measurement repeatedly with the first set of the access points being reestablished at each repeat performance of the passive measurement, and with the passive measurement being performed less often than the first active measurement; and
  perform a second active measurement repeatedly and more frequently than the first active measurement, wherein to perform the second active measurement the measurement module is configured to:
    transmit at least one third communication toward at least one access point of a second set of the access points; and
    receive at least one fourth communication which corresponds to the at least one third communication.

10. The mobile device of claim 9 wherein the measurement module is configured to use as the second set of the access points, only the access point or the access points of the first set of the access points that shares, or share, a disambiguation region with the mobile device according to a most-recent region disambiguation.

11. The mobile device of claim 9 wherein the measurement module is configured to perform only one of the first or second active measurements at a time.

12. The mobile device of claim 9 further comprising a position module, communicatively coupled to the measurement module, configured to determine a position of the mobile device using information from the first active measurement or the second active measurement each time that the first active measurement or the second active measurement, respectively, is performed.

13. The mobile device of claim 9 wherein a first operation comprises the passive measurement and the first active measurement, a second operation comprises the first active measurement, and a third operation comprises the second active measurement, and wherein the measurement module is configured to perform the third operation more often than the second operation, and to perform the second operation more often than the first operation, with multiple performances of the third operation occurring between consecutive performances of the second operation and multiple performances of the second operation occurring between consecutive performances of the first operation.

14. The mobile device of claim 9 further comprising a disambiguation module, communicatively coupled to the measurement module, configured to perform region disambiguation each time that the first active measurement is performed.

15. The mobile device of claim 9 wherein the measurement module is configured to use as the first set of the access points, all of the access points from which the mobile device receives signals during the passive measurement.

16. The mobile device of claim 9 wherein the measurement module is configured to use as the first set of the access points, less than all of the access points from which the mobile device receives signals during the passive measurement.

17. A mobile device comprising:
passive measuring means for performing a passive measurement for signals from access points to establish a first set of the access points comprising at least a subset of all the access points from which the mobile device receives the signals;
first active measuring means for performing a first active measurement for the first set of the access points, wherein for performing the first active measurement the first active measuring means is configured to:
  transmit at least one first communication toward at least one of the access points of the first set of the access points; and
  receive, from the at least one of the access points of the first set of the access points, at least one second communication which corresponds to, and is responsive to, the at least one first communication;
wherein the passive measuring means and the first active measuring means are configured to perform each of the passive measurement and the first active measurement repeatedly with the first set of the access points being reestablished at each repeat performance of the passive measurement, and with the passive measurement being performed less often than the first active measurement; and
second active measuring means for performing a second active measurement repeatedly and more frequently than the first active measurement, wherein for performing the second active measurement the second active measuring means is configured to:
  transmit at least one third communication toward at least one access point of a second set of the access points; and
  receive at least one fourth communication which corresponds to the at least one third communication.

18. The mobile device of claim 17 wherein the second active measuring means is configured to use as the second set of the access points, only the access point or the access points of the first set of the access points that shares, or share, a disambiguation region with the mobile device according to a most-recent region disambiguation.

19. The mobile device of claim 17 wherein the first active measuring means and the second active measuring means are configured to perform only one of the first or second active measurements at a time.

20. The mobile device of claim 17 further comprising position determining means for determining a position of the mobile device using information from the first active measurement or the second active measurement each time that the first active measurement or the second active measurement, respectively, is performed.

21. The mobile device of claim 17 wherein a first operation comprises the passive measurement and the first active measurement, a second operation comprises the first active measurement, and a third operation comprises the second active measurement, and wherein the passive measuring means, the first active measuring means, and the second active measuring means are configured to perform the third operation more often than the second operation, and to perform the second operation more often than the first operation, with multiple performances of the third operation occurring between consecutive performances of the second operation and multiple performances of the second operation occurring between consecutive performances of the first operation.

22. The mobile device of claim 17 further comprising position disambiguating means for performing region disambiguation each time that the first active measurement is performed.

23. The mobile device of claim 17 wherein the first active measuring means is configured to use as the first set of the access points, all of the access points from which the mobile device receives signals during the passive measurement.

24. The mobile device of claim 17 wherein the first active measuring means is configured to use as the first set of the access points, less than all of the access points from which the mobile device receives signals during the passive measurement.

25. A processor-readable storage medium comprising processor-readable instructions configured to cause a processor to:
perform a passive measurement for signals from access points to establish a first set of the access points comprising at least a subset of all of the access points from which the mobile device receives the signals;
perform a first active measurement for the first set of the access points, wherein to perform the first active measurement the instructions are configured to cause the processor to:
transmit at least one first communication toward at least one of the access points of the first set of the access points; and
receive, from the at least one of the access points of the first set of the access points, at least one second communication which corresponds to, and is responsive to, one of the at least one first communication;
wherein the instructions are configured to cause the processor to perform each of the passive measurement and the first active measurement repeatedly with the first set of the access points being reestablished at each repeat performance of the passive measurement, and with the passive measurement being performed less often than the first active measurement; and
perform a second active measurement repeatedly and more frequently than the first active measurement, wherein to perform the second active measurement the instructions are configured to cause the processor to:
transmit at least one third communication toward at least one access point of a second set of the access points; and
receive at least one fourth communication which corresponds to the at least one third communication.

26. The processor-readable storage medium of claim 25, wherein the instructions are configured to cause the processor to use as the second set of the access points, only the access point or the access points of the first set of the access points that shares, or share, a disambiguation region with a mobile device according to a most-recent region disambiguation.

27. The processor-readable storage medium of claim 25, wherein the instructions are configured to cause the processor to perform only one of the first or second active measurements at a time.

28. The processor-readable storage medium of claim 25, further comprising instructions configured to cause the processor to determine a position of a mobile device using information from the first active measurement or the second active measurement each time that the first active measurement or the second active measurement, respectively, is performed.

29. The processor-readable storage medium of claim 25, wherein a first operation comprises the passive measurement and the first active measurement, a second operation comprises the first active measurement, and a third operation comprises the second active measurement, and wherein the instructions are configured to cause the processor to perform the third operation more often than the second operation, and to perform the second operation more often than the first operation, with multiple performances of the third operation occurring between consecutive performances of the second operation and multiple performances of the second operation occurring between consecutive performances of the first operation.

30. The processor-readable storage medium of claim 25 further comprising instructions configured to cause the processor to perform region disambiguation each time that the first active measurement is performed.

31. The processor-readable storage medium of claim 25 wherein the instructions are configured to cause the processor to use as the first set of the access points, all of the access points from which a mobile device receives signals during the passive measurement.

32. The processor-readable storage medium of claim 25 wherein the instructions are configured to cause the processor to use as the first set of the access points, less than all of the access points from which a mobile device receives signals during the passive measurement.

* * * * *